US012624223B2

(12) United States Patent
Morfin

(10) Patent No.: US 12,624,223 B2
(45) Date of Patent: May 12, 2026

(54) POLYMER POWDER FOR 3D PRINTING

(71) Applicant: ARKEMA FRANCE, Colombes (FR)

(72) Inventor: Alexis Morfin, Serquigny (FR)

(73) Assignee: ARKEMA FRANCE, Puteaux (FR)

( * ) Notice: Subject to any disclaimer, the term of this patent is extended or adjusted under 35 U.S.C. 154(b) by 1 day.

(21) Appl. No.: 18/272,165

(22) PCT Filed: Jan. 14, 2022

(86) PCT No.: PCT/FR2022/050088

§ 371 (c)(1),
(2) Date: Jul. 13, 2023

(87) PCT Pub. No.: WO2022/153017

PCT Pub. Date: Jul. 21, 2022

(65) Prior Publication Data

US 2024/0101834 A1 Mar. 28, 2024

(30) Foreign Application Priority Data

Jan. 14, 2021 (FR) ...................................... 2100322

(51) Int. Cl.

| | |
|---|---|
| ***C09D 7/61*** | (2018.01) |
| ***B33Y 70/00*** | (2020.01) |
| ***C09D 5/03*** | (2006.01) |
| ***C09D 177/12*** | (2006.01) |
| *B29C 64/153* | (2017.01) |
| *B29K 77/00* | (2006.01) |
| *B29K 105/00* | (2006.01) |
| *B29K 507/04* | (2006.01) |
| *B29K 509/00* | (2006.01) |
| *B33Y 10/00* | (2015.01) |
| *C08K 3/04* | (2006.01) |
| *C08K 3/22* | (2006.01) |

(52) U.S. Cl.

CPC .............. *C09D 5/035* (2013.01); *B33Y 70/00* (2014.12); *C09D 5/031* (2013.01); *C09D 7/61* (2018.01); *C09D 177/12* (2013.01); *B29C 64/153* (2017.08); *B29K 2077/00* (2013.01); *B29K 2105/0032* (2013.01); *B29K 2507/04* (2013.01); *B29K 2509/00* (2013.01); *B33Y 10/00* (2014.12); *C08K 3/04* (2013.01); *C08K 2003/2241* (2013.01); *C08K 2003/2265* (2013.01); *C08K 2003/2289* (2013.01)

(58) Field of Classification Search

CPC .......... C09D 5/035; C09D 7/61; C09D 5/031; C09D 177/12; C08K 3/04; C08K 2003/2241; C08K 2003/2289; C08K 3/22; C08K 2003/2265; C08G 69/44; B29C 64/153; B29C 64/165; B33Y 10/00

USPC .......................................................... 524/430

See application file for complete search history.

(56) References Cited

U.S. PATENT DOCUMENTS

| | | | | |
|---|---|---|---|---|
| 6,136,948 | A | 10/2000 | Dickens, Jr. | |
| 2006/0189784 | A1 | 8/2006 | Monsheimer | |
| 2010/0178309 | A1 | 7/2010 | Matsui | |
| 2013/0052453 | A1 | 2/2013 | Filou | |
| 2020/0230875 | A1 | 7/2020 | Claus | |
| 2020/0247010 | A1 | 8/2020 | Gorin | |
| 2022/0213274 | A1 | 7/2022 | Morfin et al. | |
| 2025/0043108 | A1 * | 2/2025 | Durand | B29B 9/16 |

FOREIGN PATENT DOCUMENTS

| | | | |
|---|---|---|---|
| EP | 0 405 227 | A2 | 1/1991 |
| EP | 0 402 883 | B1 | 9/1994 |
| EP | 0 613 919 | A1 | 10/1997 |
| EP | 1 482 011 | B1 | 4/2012 |
| FR | 2 846 332 | A1 | 4/2004 |
| JP | 2002512645 | A | 4/2002 |
| JP | 2004346274 | A | 5/2003 |
| JP | 2004352794 | A | 5/2003 |
| JP | 2008056860 | A | 3/2008 |
| JP | 2008303248 | A | 12/2008 |
| JP | 2010090326 | A | 4/2010 |

(Continued)

OTHER PUBLICATIONS

International Search Report (PCT/ISA/210) mailed on May 2, 2022, by the European Patent Office as the Internal Searching Authority for International Application No. (PCT/FR2022/050088).

Written Opinion (PCT/ISA/237) mailed on May 2, 2022, by the European Patent Office as the Internal Searching Authority for International Application No. (PCT/FR2022/050088).

Japanese Patent Office Notice of Reasons for Refusal for Application No. 2023-541731 dated Dec. 16, 2025, with English translation, 26 pages.

*Primary Examiner* — Hannah J Pak

(74) *Attorney, Agent, or Firm* — Boone IP Law

(57) ABSTRACT

The invention is targeted mainly at a polymer powder suitable for 3D printing by sintering, comprising:

(a) a polymer composition comprising at least one thermoplastic elastomer;
(b) a pigment composition comprising at least one pigment exhibiting an absorbance of the light with a wavelength of 1000 nm, as measured according to the standard ASTM E1790, of less than 50%; and also, if appropriate,
(c) one or more fillers or reinforcements; and
(d) one or more additional additives.

The invention is also targeted at a process for the preparation of said powder and also at the use of said powder for 3D printing by sintering. Finally, it is targeted at the use of a pigment exhibiting an absorbance of the light with a wavelength of 1000 nm, as measured according to the standard ASTM E1790, of less than 50% to improve the definition and/or the mechanical properties of the articles printed by a process of 3D printing by sintering of a thermoplastic elastomer powder.

9 Claims, No Drawings

(56) References Cited

FOREIGN PATENT DOCUMENTS

| | | | |
|---|---|---|---|
| JP | 201379404 | A | 5/2013 |
| WO | 96/06881 | A1 | 3/1996 |
| WO | 9841385 | A1 | 9/1998 |
| WO | 2018122734 | A1 | 7/2018 |
| WO | 2020229782 | A1 | 11/2020 |

* cited by examiner

POLYMER POWDER FOR 3D PRINTING

TECHNICAL FIELD

The present patent application relates to a thermoplastic elastomer powder of use for 3D printing by sintering, to a process for its manufacture, and also to its use for 3D printing by sintering. It furthermore relates to the use of specific pigments to improve the definition and/or the mechanical properties of articles printed from thermoplastic elastomer by 3D printing by sintering.

PRIOR ART 3D printing, or additive manufacturing, denotes various techniques for the manufacture of articles by addition of material and not by subtraction, and is currently experiencing remarkable growth.

Among the 3D printing processes available today, some use a bed of polymer powder to build the article, layer by layer, by localized sintering of grains of powder, for example by means of a laser (technique called "selective laser sintering" or SLS) or of the targeted application of a binding agent and of a "detailing agent" and subsequent heating (technique called "Multi-jet fusion" or MJF).

In most machines for 3D printing by sintering, the powder, preheated in a reservoir tank close to the the construction chamber, is introduced into the construction chamber, spread in a thin layer and then heated, for example from above by infrared (IR) radiation lamps, before being selectively melted by an electromagnetic energy source. The homogeneity of the temperature in the powder bed constitutes a particular challenge. This is because the powder is heated to a temperature situated in the interval between the crystallization temperature Tc and the melting temperature Tf of the polymer. This interval depends on the polymer used but is often quite small, of the order of 30° C.

The processability window, defined as the range of temperatures at which the powder can give good quality parts, is even more restricted, and is most often less than 10° C., indeed even 5° C. Control of the temperature in the powder bed before its selective melting is thus very important. However, the homogeneous illumination of the entire bed is technically difficult, due to the modularity of the lamps used for this purpose. Moreover, the IR radiation does not heat the air but the surface of the solid which it strikes. This results in a variation in temperature in the powder bed and between the air in the construction chamber and the surface of the powder bed which can reach several degrees.

However, a nonhomogeneous temperature in the powder can cause various problems. When the temperature of the powder is too high, the powder tends to agglomerate, a phenomenon which is called "caking", and which prevents the powder from correctly spreading. Furthermore, the subsequent selective melting of a powder which is too hot can result in sintering of the neighboring grains as well, and harm the good definition of the articles. When, conversely, the temperature of the powder is too low, the grains can be incompletely sintered. This has the effect of damaging the mechanical properties of the printed article. Finally, a temperature difference, for example between the air of the chamber and the surface of the powder, can create stresses in the part, which cause its deformation. This phenomenon, called "curling", often prevents the printing from being continued and thus has, as consequence, significant losses.

The variations in temperature in the bed of polymer powder can thus have harmful consequences in terms of quality of the printed article, indeed even can compromise its production.

Thermoplastic elastomers are particularly advantageous since they combine, in one and the same polymer, mechanical properties having very good resistance to thermal aging or aging under UV, and also a low density, and thus make possible the preparation of light and flexible articles. The variations in temperature in the powder are, however, particularly troublesome for these polymers because of their expanded melting temperature, especially when the enthalpy of fusion is low.

Due to the problems discussed above, the articles obtained by 3D printing by sintering of powder of thermoplastic elastomers can be problematic to implement and the articles manufactured do not always exhibit the desired appearance and/or properties.

There thus exists a need to provide a solution to the abovementioned problems, in particular to be able to manufacture, with a thermoplastic elastomer powder, by 3D printing by sintering, articles of good quality, having good mechanical properties and precise and well-defined dimensions and contours. There is also a need to provide a solution for widening the working window of these polymers, and thus implementing the printing process more easily and/or with more polymers.

SUMMARY OF THE INVENTION

It is an aim of the invention to provide a solution to one or more of the abovementioned problems.

This is because the present invention is based on the unexpected observation that the addition, to the thermoplastic elastomer powder, of pigments having low absorbance of IR rays—also called IR cooling pigments—makes it possible, by lowering the sensitivity of the powder to the light power, to reduce the effect of the spatial heterogeneity of the energy supplied by the IR light on the temperature of the thermoplastic elastomer powder.

The heating of the thermoplastic elastomer powder which is thus slowed down makes it possible, by means of a better thermal balance, to reduce the temperature difference between the surface of the powder layer and the surrounding air.

The presence of the IR cooling pigment in the thermoplastic elastomer powder furthermore reduces the temporal heterogeneity of the temperature of the powder, by reducing the oscillations around the target temperature, and makes it possible to work at a temperature closer to the melting temperature.

These phenomena make it possible to widen the working window of a given thermoplastic elastomer, which facilitates the 3D printing by sintering and makes it possible for certain thermoplastic elastomers, the working window of which would otherwise be insufficient.

The presence of the IR cooling pigment in the powder brings about a slowing of the heating of the order of a few seconds for each layer. However, taking into account the time-saving at the level of the thermal stabilization, a substantial increase in the overall construction time is not observed.

Consequently, according to a first aspect, a subject matter of the invention is a polymer powder suitable for 3D printing by sintering, comprising:

(a) a polymer composition comprising at least one thermoplastic elastomer;

(b) a pigment composition comprising at least one pigment exhibiting an absorbance of the light with a wavelength of 1000 nm, as measured according to the standard ASTM E1790, of less than 50%; and also, if appropriate, (c) one or more fillers or reinforcements; and (d) one or more additional additives.

Advantageously, the powder exhibits a Dv50 diameter, as measured according to the standard ISO 9276—Parts 1 to 6, of 40 to 150 µm.

Preferably, the polymer composition (a) comprises a thermoplastic elastomer chosen from the group consisting of the SBS, SIS, SEBS, TPU, COPE and PEBA block copolymers and also their mixtures and alloys, and in particular it comprises a PEBA. Alternatively, the polymer composition (a) can comprise a thermoplastic elastomer chosen from TPO, PP/NBR, PO/CPE-VD, EVA/VC and PVC/NBR mixtures.

According to one embodiment, the pigment composition (b) comprises at least one pigment exhibiting an absorbance of the light with a wavelength of 1000 nm, as measured according to the standard ASTM E1790, of less than 40%. The pigment composition (b) can comprise at least one compound chosen from metal oxides and transition metal oxides, and also their corresponding mixtures, mixed oxides and doped oxides. In particular, it can comprise at least one oxide chosen from tin, magnesium, copper, zinc, iron, manganese, cobalt, nickel, aluminum, antimony, chromium, titanium or silicon oxides or one of their corresponding mixtures, mixed oxides or doped oxides.

According to a second aspect, the invention is targeted at a process for the preparation of such a powder, comprising the stages of:

(i) grinding a composition comprising a thermoplastic elastomer to give a powder with a diameter Dv50 of 40 to 150 µm, before or after (ii) introduction of at least one pigment exhibiting an absorbance of the light with a wavelength of 1000 nm, as measured according to the standard ASTM E1790, of less than 50%, and also of one or more additional additives, if appropriate.

According to a third aspect, the invention is targeted at the use of such a powder for 3D printing by sintering, in particular chosen from the selective laser sintering (SLS) process, the sintering process of the MJF (Multi Jet Fusion) type and the sintering process of the HSS (High Speed Sintering) type.

According to a fourth aspect, the invention is targeted at the use of a pigment exhibiting an absorbance of the light with a wavelength of 1000 nm of less than 50%, as measured according to the standard ASTM E1790, in order to improve the definition and/or the mechanical properties of an article manufactured by a process of 3D printing by sintering of a thermoplastic elastomer powder. Advantageously, the pigment comprises a compound chosen from metal oxides and transition metal oxides, and also their corresponding mixtures, mixed oxides and doped oxides. Preferably, it comprises a compound chosen from tin, magnesium, copper, zinc, iron, manganese, cobalt, nickel, aluminum, antimony, chromium, titanium or silicon oxides or one of their corresponding mixtures, mixed oxides or doped oxides.

According to a fifth aspect, the invention is finally targeted at an article obtained by 3D printing by sintering of such a powder.

DESCRIPTION OF THE EMBODIMENTS

Definition of the Terms

The term "thermoplastic polymer" is understood to denote a polymer which has the property of softening when sufficiently heated and which, on cooling, becomes hard again.

The term "thermoplastic elastomer" is understood to denote a polymer comprising flexible segments and rigid segments, for example in the form of a block copolymer, in which the segments form rigid domains which disappear when the temperature increases. Alternatively, they can be mixtures combining the presence of a flexible elastomeric phase, which is or is not crosslinked, dispersed in a rigid continuous thermoplastic phase. The mixtures can in particular be mixtures of a thermoplastic polymer with an elastomer.

The term "copolymer" is understood to denote a polymer resulting from the copolymerization of at least two chemically different types of monomer, referred to as comonomers. A copolymer is thus formed of at least two repeat units. It can also be formed of three or more repeat units.

More specifically, the term "sequential copolymer" or "block copolymer" is understood to denote copolymers in the abovementioned meaning, in which at least two distinct homopolymer blocks are linked by a covalent bond. The length of the blocks can be variable. Preferably, the blocks are composed of 1 to 1000, preferably 1 to 100 and in particular 1 to 50 repeat units, respectively. The link between the two homopolymer blocks can sometimes require an intermediate nonrepeat unit known as a junction block.

The term "melting temperature" is understood to denote the temperature at which an at least partially crystalline polymer passes into the viscous liquid state, as measured by differential scanning calorimetry (DSC) according to the standard NF EN ISO 11357-3 using a heating rate of 20° C./min.

The term "crystallization point" is understood to denote the temperature at which an at least partially crystalline polymer passes from the viscous liquid state to the solid state, as measured by differential scanning calorimetry (DSC) according to standard NF EN ISO 11357-3 using a cooling rate of 20° C./min.

The term "glass transition temperature" is understood to denote the temperature at which an at least partially amorphous polymer passes from a rubbery state into a glassy state, or vice versa, as measured by differential scanning calorimetry (DSC) according to the standard NF EN ISO 11357-2 using a heating rate of 20° C./min.

The term "enthalpy of fusion" is understood to denote the heat consumed during the solid/liquid transition of the thermoplastic elastomer, as measured by differential scanning calorimetry, according to the standard ISO 11257-3:1999.

The term "pigment" is understood to denote a coloring inorganic or organic compound which is soluble or insoluble in the medium which it colors.

The term "pigment having low absorbance of IR rays" or "IR cooling pigment" is understood to denote a pigment, the absorbance of which of rays with a wavelength of 1000 nm, and preferably wavelengths of the spectrum from 750 to 1250 nm, as measured by UV-Vis-NIR spectrometry according to the standard ASTM E1790, is less than 50%, preferably less than 45%, more preferably less than 40% and preferably less than 35%. The absorbance A is defined by the logarithm of the ratio of the intensity $$I_\lambda^0$$

of a light ray before passing through a cell of solution of the pigment of concentration c to the intensity $I_\lambda$ of a light ray of wavelength λ after passing through this cell. The intensities $$I_\lambda^0$$

and $I_\lambda$ can be measured on a spectrophotometer. The absorbance is then given by the Beer-Lambert law, according to the formula:

$$A_\lambda = \log\frac{I_\lambda^0}{I_\lambda} = \varepsilon_\lambda lc \quad \text{[Math 1]}$$

in which $\varepsilon_\lambda$ is the specific molar absorbance coefficient in $l \cdot mol^{-1} \cdot cm$-1, l the optical path of the cell in cm and c the concentration in $mol \cdot l^{-1}$.

More specifically, it can be a pigment which reflects IR radiation or a pigment which is transparent in this region.

Furthermore, the term "volume-average diameter" or "Dv" is understood to mean the volume-average diameter of a pulverulent substance, as measured according to the standard ISO 9276—Parts 1 to 6: "Representation of results of particle size analysis". Various diameters are distinguished. More specifically, Dv50 denotes the volume-median diameter and Dv10 and Dv90 respectively denote the volume-average diameters below which are located 10% or 90% by volume of the particles. The volume-average diameter can be measured in particular by means of a laser particle sizer, for example a laser particle sizer (Sympatec Helos) and software (Fraunhofer) making it possible to obtain the volumetric distribution of a powder and to deduce the Dv10, the Dv50 and the Dv90 therefrom.

Finally, the term "3D printing by sintering" is understood to denote processes in which a layer of polymer powder is selectively irradiated by electromagnetic radiation (for example laser beam, infrared radiation, UV radiation), so as to melt the powder particles impacted by the radiation. The molten particles coalesce and solidify to result in the formation of a solid mass. This process can produce 3D articles by repeated irradiation of a succession of freshly applied layers of powder.

The term "viscosity" is understood to denote inherent viscosity as measured in a viscometer of Ubbelohde type according to the standard ISO 307:2019, except for using m-cresol as solvent and a temperature of 20° C. The inherent viscosity has the dimension of the inverse of a concentration and is equal to the natural logarithm of the relative viscosity, all divided by the concentration of polymer dissolved in the solvent.

The number-average molar mass of the polymers described, and in particular of the constituent blocks of the thermoplastic elastomers, can be measured before copolymerization by size exclusion chromatography (SEC), according to the standard ISO 16014-1:2019 using hexafluoroisopropanol (HFIP) as eluent.

The nomenclature used to denote the polyamides follows the standard ISO 1874-1. In particular, in the PA X notation, X represents the number of carbon atoms of the polyamide units resulting from the condensation of an amino acid or lactam. In the PA XY notation denoting a polyamide resulting from the condensation of a diamine with a dicarboxylic acid, X represents the number of carbon atoms of the diamine and Y represents the number of carbon atoms of the dicarboxylic acid. The notations PA X/Y, PA X/Y/Z, and the like, relate to copolyamides in which X, Y, Z, and the like, represent homopolyamide units as described above.

According to the present invention, there is provided a polymer powder suitable for 3D printing by sintering, comprising:

(a) a polymer composition comprising at least one thermoplastic elastomer;

(b) a pigment composition comprising at least one pigment exhibiting an absorbance of the light with a wavelength of 1000 nm, as measured according to the standard ASTM E1790, of less than 50%; and also, if appropriate, (c) one or more fillers or reinforcements; and (d) one or more additional additives.

A. Thermoplastic Elastomer

The component (a) of the powder according to the invention, a polymer composition, comprises, according to the invention, at least one thermoplastic elastomer.

The thermoplastic elastomer can in principle be of any nature, subject to having the properties, in particular thermal properties, suitable for 3D printing by sintering.

The thermoplastic elastomer can in particular be a copolymer having styrenic blocks (TPS), in particular having polystyrene and polybutadiene blocks (SBS), a copolymer having polystyrene and polyisoprene blocks (SIS), a copolymer having polystyrene and poly(ethylene/butylene) blocks (SEBS), a copolymer having isocyanate and ether or ester blocks (TPU), a copolymer having polyester and polyester or polyether blocks (COPE) or also a copolymer having polyamide and polyether blocks (PEBA).

Such thermoplastic elastomers are commercially available, for example the products Cawiton®, Thermolast K®, Thermolast M®, Sofprene®, Dryflex® and Laprene® (TPSs), Desmopan® or Elastollan® (TPUs), Santoprene®, Termoton®, Solprene®, Thermolast V®, Vegaprene® or Forprene® (TPVs), and For-Tec E® or Engage, Ninjaflex® (TPOs).

According to another embodiment, the thermoplastic elastomer is a "PEBA" copolymer. These copolymers are in particular sold by Arkema France under the name Pebax®, by Evonik® under the name Vestamid®, by EMS under the name Grilamid® and by Sanyo under the name Pelestat®.

Alternatively, a mixture of a flexible polymer phase dispersed in a continuous phase of rigid polymer may be concerned. Mention may be made, by way of example of such mixtures, of an EPDM dispersed in a polyolefin (TPO) or a thermoplastic vulcanizate (TPV), a copolymer of butadiene and acrylonitrile (NBR), vulcanized or not, dispersed in a polypropylene (PP/NBR), a chlorinated polyethylene dispersed in a polyolefin (PO/CPE-VD), an EVA dispersed in vinylidene chloride (EVA/VC) or also a copolymer of butadiene and acrylonitrile (NBR), vulcanized or not, dispersed in a polyvinyl chloride (PVC/NBR).

The thermoplastic elastomer can in particular exhibit an enthalpy of fusion of between 10 and 45 J/g. In particular, it can be from 10 to 15 J/g; or from 15 to 20 J/g; or from 20 to 25 J/g; or from 25 to 30 J/g; or from 30 to 35 J/g; or from 35 to 40 J/g.

Copolymers Having Polyamide Blocks and Having Polyether Blocks (PEBAs)

According to a first embodiment, the semicrystalline thermoplastic polymer is a "PEBA" copolymer; it can preferably be a linear (noncrosslinked) copolymer.

PEBAs can result from the condensation of polyamide (PA) blocks having reactive ends with polyether (PE) blocks having reactive ends, such as:

1) of polyamide blocks having diamine chain ends with polyoxyalkylene blocks having dicarboxyl chain ends;
2) of polyamide blocks having dicarboxyl chain ends with polyoxyalkylene blocks having diamine chain ends;
3) of polyamide blocks having dicarboxyl chain ends with polyetherdiols, the products obtained being, in this specific case, polyetheresteramides.

The polyamide blocks having dicarboxyl chain ends originate, for example, from the condensation of polyamide precursors in the presence of a chain-limiting dicarboxylic acid. The polyamide blocks having diamine chain ends originate, for example, from the condensation of polyamide precursors in the presence of a chain-limiting diamine.

Use may advantageously be made of three types of polyamide blocks.

According to a first type, the polyamide blocks originate from the condensation of a dicarboxylic acid with an aliphatic, cycloaliphatic or aromatic diamine. The dicarboxylic acid can comprise from 4 to 36 and preferably from 6 to 18 carbon atoms. It is preferably an aliphatic, in particular linear, cycloaliphatic or aromatic dicarboxylic acid. Mention may be made, by way of examples, of butanedioic acid, adipic acid, azelaic acid, suberic acid, sebacic acid, dodecanedicarboxylic acid, octadecanedicarboxylic acid, terephthalic acid and isophthalic acid, and dimerized fatty acids. These dimerized fatty acids preferably have a dimer content of at least 98%; preferably, they are hydrogenated; they are, for example, the products sold under the Pripol® brand name by Croda or under the Empol® brand name by BASF or under the Radiacid® brand name by Oleon, and polyoxyalkylene-α,ω-diacids. The diamine can comprise in particular from 2 to 20, preferably from 6 to 14, carbon atoms. Mention may be made, by way of examples, of tetramethylenediamine, hexamethylenediamine, 1,10-decamethylenediamine, dodecamethylenediamine and trimethylhexamethylenediamine. The polyamide blocks PA 412, PA 414, PA 418, PA 54, PA 59, PA 510, PA512, PA513, PA514, PA516, PA518, PA536, PA64, PA69, PA610, PA612, PA613, PA616, PA 618, PA 636, PA 912, PA 104, PA 109, PA 1010, PA 1012, PA 1013, PA 1014, PA 1016, PA 1018, PA 1036, PA 10T, PA 124, PA 129, PA 1210, PA 1212, PA 1213, PA 1214, PA 1216, PA 1218, PA 1236, PA 12T and their mixtures are preferred. The PA 610, PA 1010, PA 1012 blocks and also their mixtures are particularly preferred.

According to a second type, the polyamide blocks result from the condensation of one or more α,ω-aminocarboxylic acids and/or of one or more lactams. Mention may be made, by way of examples of α,ω-aminocarboxylic acids, of aminocaproic acid, 7-aminoheptanoic acid, 11-aminoundecanoic acid and 12-aminododecanoic acid. Mention may be made, by way of examples, of lactams having from 6 to 12 carbon atoms and in particular caprolactam, oenantholactam and lauryllactam. The polyamide blocks PA 11, PA 12 and PA 6 are particularly preferred.

According to a third type, the polyamide blocks are copolyamides. These blocks can be obtained, for example, by condensation of one or more α,ω-aminocarboxylic acids or lactams and of at least one diamine with at least one dicarboxylic acid.

According to an alternative form, the polyamide blocks result from the condensation of at least two α,ω-aminocarboxylic acids or of at least two lactams having from 6 to 12 carbon atoms or of a lactam and of an α,ω-aminocarboxylic acid with a different number of carbon atoms. The α,ω-aminocarboxylic acids, lactams, diamines and diacids can be chosen in particular from those listed above for the polyamide blocks of the first and second types. PA 66/6 and PA 66/610/11/12 are particularly preferred.

Advantageously, the PEBA comprises polymer blocks chosen from PA 6, PA 11, PA 12, PA 412, PA 414, PA 418, PA 54, PA 59, PA 510, PA 512, PA 513, PA 514, PA 516, PA 518, PA 536, PA 64, PA 69, PA 610, PA 612, PA 613, PA 614, PA 616, PA 618, PA 636, PA 912, PA 104, PA 109, PA 1010, PA 1012, PA 1013, PA 1014, PA 1016, PA 1018, PA 1036, PA 10T, PA 124, PA 129, PA 1210, PA 1212, PA 1213, PA 1214, PA 1216, PA 1218, PA 1236, PA 12T, PA 66/6, PA 66/610/11/12, in particular from PA 6, PA 11, PA 12, PA 610, PA 1010, PA 1012, and also their mixtures and copolymers.

These polyamide blocks can be prepared by polycondensation of the monomers in the presence of an appropriate chain-limiting agent. Such chain-limiting agents are, for example, dicarboxylic acids, in particular comprising from 4 to 10 carbon atoms, and diamines. Consequently, it is possible to use, as chain-limiting agent, the dicarboxylic acid or the diamine employed as monomer, which is introduced in excess. In the case of polycondensation of α,ω-aminocarboxylic acids or of lactams, a chain-limiting agent can be added to the monomers.

The polyether blocks of the PEBA comprise essentially or consist of alkylene oxide units.

The polyether blocks can result from alkylene glycols, such as PEG (polyethylene glycol), PPG (polypropylene glycol), PO3G (polytrimethylene glycol) or PTMG (polytetramethylene glycol). They can also result from copolyethers comprising different alkylene oxides distributed in the chain uniformly, in particular in blocks, or randomly. The polyether blocks can also be obtained by oxyethylation of bisphenols, such as bisphenol A. These products are described in particular in the document EP 613 919 A1.

The polyether blocks can also be ethoxylated primary amines, such as the products of formula:

[Chem 1]

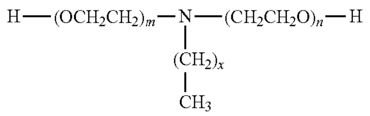

in which m and n are integers of between 1 and 20 and x is an integer of between 8 and 18. These products are, for example, commercially available under the Noramox® brand name from CECA and under the Genamin® brand name from Clariant.

The polyether blocks can finally comprise or consist of polyoxyalkylene blocks having $NH_2$ chain ends. Such blocks can be obtained by cyanoacetylation of polyetherdiols. Such polyethers are sold by Huntsman under the Jeffamine® or Elastamine® name (for example, Jeffamine® D400, D2000, ED 2003 or XTJ 542).

A method for the two-stage preparation of PEBAs having ester bonds between the PA blocks and the PE blocks is described in the document FR 2 846 332 A1. A method for the preparation of PEBAs having amide bonds between the PA blocks and the PE blocks is described in the document EP 1 482 011 A1. The polyether blocks can also be mixed with polyamide precursors and a diacid chain-limiting agent in order to prepare PEBAs by a one-stage process.

While the PEBAs generally comprise a polyamide block and a polyether block, they can also comprise two, three, four, indeed even more, different blocks chosen from those described.

PEBAs which are particularly preferred are the copolymers comprising the following blocks: PA 11 and resulting from PEG; PA 11 and resulting from PTMG; PA 11 and resulting from PPG; PA 12 and resulting from PEG; PA 12 and resulting from PTMG; PA 12 and resulting from PPG; PA 1010 and resulting from PEG; PA 1010 and resulting from PTMG; PA 1010 and resulting from PPG; PA 610 and resulting from PTMG; PA 610 and resulting from PEG; PA 610 resulting from PPG; PA 6 and resulting from PEG; PA 6 and resulting from PTMG; and PA 6 and resulting from PPG.

The number-average molar mass of the polyamide blocks in the PEBA preferably has a value from 100 to 20 000 g/mol, especially from 200 to 10 000 g/mol and in particular from 200 to 2000 g/mol. It can in particular be from 100 to 200 g/mol, or from 200 to 500 g/mol, or from 500 to 1000 g/mol, or from 1000 to 1500 g/mol, or from 1500 to 2000 g/mol, or from 2000 to 2500 g/mol, or from 2500 to 3000 g/mol, or from 3000 to 3500 g/mol, or from 3500 to 4000 g/mol, or from 4000 to 5000 g/mol, or from 5000 to 6000 g/mol, or from 6000 to 7000 g/mol, or from 7000 to 8000 g/mol, or from 8000 to 9000 g/mol, or from 9000 to 10 000 g/mol, or from 10 000 to 11 000 g/mol, or from 11 000 to 12 000 g/mol, or from 12 000 to 13 000 g/mol, or from 13 000 to 14 000 g/mol, or from 14 000 to 15 000 g/mol, or from 15 000 to 16 000 g/mol, or from 16 000 to 17 000 g/mol, or from 17 000 to 18 000 g/mol, or from 18 000 to 19 000 g/mol, or from 19 000 to 20 000 g/mol.

The number-average molar mass of the polyether blocks in the PEBA preferably has a value from 100 to 6000 g/mol, more preferentially from 200 to 3000 g/mol, more preferentially still from 800 to 2500 g/mol. It can in particular be from 100 to 200 g/mol, or from 200 to 500 g/mol, or from 500 to 800 g/mol, or from 800 to 1000 g/mol, or from 1000 to 1500 g/mol, or from 1500 to 2000 g/mol, or from 2000 to 2500 g/mol, or from 2500 to 3000 g/mol, or from 3000 to 3500 g/mol, or from 3500 to 4000 g/mol, or from 4000 to 4500 g/mol, or from 4500 to 5000 g/mol, or from 5000 to 5500 g/mol, or from 5500 to 6000 g/mol.

The ratio by weight of the polyamide blocks, with respect to the polyether blocks, of the PEBA can in particular have a value from 0.1 to 20. This ratio by weight can be calculated by dividing the number-average molar mass of the polyamide blocks by the number-average molar mass of the polyether blocks.

Thus, the ratio by weight of the polyamide blocks with respect to the polyether blocks of the PEBA can be from 0.1 to 0.2; or from 0.2 to 0.3; or from 0.3 to 0.4; or from 0.4 to 0.5; or from 0.5 to 1; or from 1 to 2; or from 2 to 3; or from 3 to 4; or from 4 to 5; or from 5 to 7; or from 7 to 10; or from 10 to 13; or from 13 to 16; or from 16 to 19; or from 19 to 20. A ratio by weight of 2 to 19 and more specifically of 4 to 10 is particularly preferred.

Copolymer Having Polyester Blocks and Having Polyether Blocks (COPE)

According to another embodiment, the thermoplastic elastomer is a copolyetherester (COPE).

The COPEs comprise at least one polyether (PE) block and at least one polyester (homopolyester or copolyester) (PES) block.

The COPEs comprise flexible PE blocks resulting from polyetherdiols and rigid polyester blocks which result from the reaction of at least one dicarboxylic acid with at least one short diol. The PES blocks and the PE blocks are connected via ester bonds resulting from the reaction of the acid functions of the dicarboxylic acid with the OH functions of the polyetherdiol.

The linking of the polyethers and the diacids forms the flexible blocks whereas the linking of the short diol with the diacids forms the rigid blocks of the copolyetherester.

Advantageously, the diacids are aromatic dicarboxylic acids having from 8 to 14 carbon atoms. Up to 50 mol % of the aromatic dicarboxylic acid can be replaced by at least one other aromatic dicarboxylic acid having from 8 to 14 carbon atoms, and/or up to 20 mol % can be replaced by an aliphatic dicarboxylic acid having from 2 to 14 carbon atoms. Mention may be made, as examples of aromatic dicarboxylic acids, of terephthalic acid, isophthalic acid, dibenzoic acid, naphthalenedicarboxylic acid, 4,4'-diphenylenedicarboxylic acid, bis(p-carboxyphenyl)methane, ethylenebis(p-benzoic acid), 1,4-tetramethylenebis(p-oxybenzoic acid), ethylenebis(p-oxybenzoic acid) or 1,3-trimethylenebis(p-oxybenzoic acid).

The short diol can in particular be an aliphatic glycol of formula $HO(CH_2)_nOH$ in which n is an integer having a value from 2 to 10, in particular ethylene glycol, 1,3-trimethylene glycol, 1,4-tetramethylene glycol, 1,6-hexamethylene glycol, 1,3-propylene glycol, 1,8-octamethylene glycol and 1,10-decamethylene glycol, or also neopentyl glycol.

The preferred PES units result from the reaction of an aromatic dicarboxylic acid, in particular terephthalic acid, with a glycol, in particular ethanediol or 1,4-butanediol. Such copolyetheresters are described in the patents EP 402 883 A1 and EP 405 227 A1.

The PE units can result from the polyetherdiols as defined above, for example polyethylene glycol (PEG), polypropylene glycol (PPG), polytrimethylene glycol (PO3G) or polytetramethylene glycol (PTMG). The PES units can result from the reaction of a dicarboxylic acid, such as terephthalic acid, with a glycol, such as in particular ethanediol or 1,4-butanediol. Such copolyetheresters are described in the patents EP 402 883 A1 and EP 405 227 A1.

The number-average molar mass of the polyester blocks preferably has a value from 100 to 20 000 g/mol, especially from 200 to 10 000 g/mol, more preferably from 200 to 2000 g/mol. That of the polyether blocks is as described above for the PEBAs.

The ratio by weight of the polyester blocks, with respect to the polyether blocks, of the COPE can in particular have a value from 0.1 to 20. The ratio by weight can in particular be from 0.1 to 0.2; or from 0.2 to 0.3; or from 0.3 to 0.4; or from 0.4 to 0.5; or 0.5 to 1; or from 1 to 2; or from 2 to 3; or from 3 to 4; or from 4 to 5; or from 5 to 7; or from 7 to 10; or from 10 to 13; or from 13 to 16; or from 16 to 19; or from 19 to 20. A ratio by weight of 2 to 19 and more specifically of 4 to 10 is particularly preferred.

Thermoplastic Polyurethane (TPU)

According to another embodiment, the thermoplastic elastomer is a TPU, i.e. a copolymer having polyurethane (PU) blocks and polyether (PE) blocks, also called polyetherurethane, or a copolymer having polyurethane (PU) blocks and polyester (PES) blocks, also called polyesterurethane.

The TPUs of the first type mentioned above result from the condensation of polyetherdiols with polyurethanes. The rigid PU blocks and the flexible PE blocks are connected via bonds resulting from the reaction of the isocyanate functions of the polyurethane with the —OH functions of the polyetherdiol.

The PU blocks can result from the reaction of at least one diisocyanate, which can be chosen from aromatic diisocyanates (e.g.: MDI, TDI) and/or aliphatic diisocyanates (e.g.: HDI or hexamethylene diisocyanate), with at least one short diol. This short diol can be chosen from the glycols mentioned above in the description of the copolyetheresters, in particular polyethylene glycol (PEG), poly(1,2-propylene glycol) (PPG), poly(1,3-propylene glycol) (PO3G) or polytetramethylene glycol (PTMG).

The TPUs of the second type mentioned above result from the condensation of flexible polyesters with polyisocyanates. The rigid PU blocks and the flexible PES blocks are connected via bonds resulting from the reaction of the isocyanate functions of the polyurethane with the terminal functions of the polyester.

The PU blocks can be as described above for the TPUs of the first type. The flexible PES blocks can result from the reaction of an aliphatic dicarboxylic acid having from 4 to 12 carbon atoms, in particular adipic acid, with a glycol, such as ethanediol or 1,4-butanediol. Such copolyetheresters are described in the patents EP 402 883 A1 and EP 405 227 A1.

The number-average molar mass of the PU blocks in the TPUs preferably has a value from 100 to 20 000 g/mol, especially from 200 to 10 000 g/mol and in particular from 200 to 2000 g/mol. That of the polyether blocks is as described above for the PEBAs.

The ratio by weight of the polyurethane blocks, with respect to the polyether blocks, of the TPU can in particular have a value from 0.1 to 20. In particular, it can be from 0.1 to 0.2; or from 0.2 to 0.3; or from 0.3 to 0.4; or from 0.4 to 0.5; or 0.5 to 1; or from 1 to 2; or from 2 to 3; or from 3 to 4; or from 4 to 5; or from 5 to 7; or from 7 to 10; or from 10 to 13; or from 13 to 16; or from 16 to 19; or from 19 to 20. A ratio by weight of 2 to 19 and more specifically of 4 to 10 is particularly preferred.

The elastomer present in the component (a) of the powder of the invention preferably has a melting temperature (Tm) ranging from 100 to 300° C. and preferably from 120 to 200° C. This Tm corresponds to that measured in the first heating. Furthermore, the thermoplastic elastomer preferably has a crystallization temperature (Tc) ranging from 40 to 250° C. and preferably from 45 to 200° C., for example from 45 to 150° C. Typically, the Tm and the Tc are determined directly from the polymer powder. When a mixture of polymers is concerned, the Tm selected is the lowest Tm in the mixture of polymers, and the Tc selected will be the highest Tc in the mixture of polymers.

Finally, the difference between the Tc and the Tm of the thermoplastic elastomer is preferably greater than or equal to 20° C., preferably greater than or equal to 30° C., more preferably greater than or equal to 40° C., or greater than or equal to 50° C., or greater than or equal to 60° C., or greater than or equal to 70° C., or greater than or equal to 80° C.

The component (a) can comprise just one or several thermoplastic elastomers as described above. According to one embodiment, the component (a) can furthermore also comprise up to 50% by weight of one or more additional thermoplastic polymers. Preferably, however, the component (a) consists solely of thermoplastic elastomer.

Preferably, the polymer powder according to the invention comprises from 30% to 99%, preferably from 40% to 95%, especially from 50% to 90% and in particular from 70% to 85% by weight of component (a).

B. The Pigment Component

The powder according to the invention furthermore comprises a pigment component (b), which comprises at least one pigment exhibiting an absorbance of the light with a wavelength of 1000 nm, as measured according to the standard ASTM E1790, of less than 50%.

These pigments, denoted IR cooling pigments in that which follows, are pigments having low absorbance of IR radiation, in particular in the range from 750 to 1250 nm, and especially at 1000 nm. IR cooling pigments are known as such and are commercially available, in particular for the preparation of exterior paints having high total solar reflectance (TSF).

IR cooling pigments can be opaque, transparent or translucent to visible light. Their low absorbance of IR rays can be due to the fact that they do not interact with light of these wavelengths—these pigments are then transparent to IR rays. Alternatively, they can be pigments having the property of reflecting IR rays.

IR cooling pigments can be inorganic or organic pigments.

According to one embodiment, the IR cooling pigment used is an inorganic pigment. More specifically, the IR cooling pigment can comprise a compound chosen from metal oxides and transition metal oxides. It can in particular be a compound chosen from tin, magnesium, copper, zinc, iron, manganese, cobalt, nickel, aluminum, antimony, chromium, titanium or silicon oxides or one of their mixtures.

The IR cooling pigment can also comprise a mixed metal oxide. The IR cooling pigment can also comprise such an oxide doped by another compound, in particular another metal. They can be pigments belonging to the supergroup of spinels which brings together inorganics of empirical formula $AB_2X_4$ in which the anions X form a compact face-centered cubic stack and the cations A and B share a portion of the octahedral and tetrahedral sites provided by the stacking of the anions. Normal spinels are distinguished from inverse spinels. Among these, a spinel pigment comprising one or more metals chosen from magnesium, zinc, iron, magnesium, manganese, aluminum, titanium or silicon may be concerned in particular. Preferably, the pigment composition (b) is devoid of $TiO_2$.

The IR cooling pigments can be homogeneous or heterogeneous. Thus, an IR cooling pigment can be a pure substance or a composite material, for example in the form of core-shell particles, for example a core of silica coated with copper, or a particle of mica coated with titanium dioxide.

Mention may be made, by way of specific examples of IR cooling pigments sold in the category of pigments which reflect IR rays, for example, of Sicotan® Yellow K 1010, Sicotan® Yellow K 1011/K 101 1 FG, Sicopal® Yellow K 1120 FG, Sicopal® Yellow K 1160 FG, Sicotan® Yellow K 2001 FG, Sicotan® Yellow K 2011 FG, Sicotan® Yellow NBK 2085, Sicotan® Yellow K 2111 FG, Sicotan® Yellow K 21 12 FG, Meteor® Plus Buff 9379, Meteor® Plus Buff 9379 FF, Meteor® Plus Buff 9399 FF, Meteor® Buff 7302, Meteor® Plus Golden 9304, Sicotan® Orange K 2383, Sicotrans® Red K 2819, Sicotrans® Red K 2915, Meteor® Plus Red-Buff 9384, Sicopal® Brown K 2595, Sicotan® Brown K 261 1, Sicotan® Brown K 2711, Sicopal® Brown K 2795 FG, Meteor® Plus Brown 9730, Meteor® Plus Brown 9770, Sicotan® Brown NBK 2755, Sicopal® Blue K 6310, Meteor® Plus Blue 9538, Sicopal® Green K 9110, Sicopal® Green K 9710, Meteor® Plus Green 9444, Meteor® Plus Black 9875, Meteor® Plus Black 9880, Meteor® Plus Black 9887, Meteor® Plus Black 9891, Sicopal® Black K 0095 from BASF; Blue 211, Blue 214, Blue 385, Blue 424, Green 187B, Green 223, Green 410, Green 260, Yellow 10P1 10, Yellow 10P225, Yellow 10P270, Brown 10P857, Brown 10P835, Brown 10P850, Black 10P922, Black 411 A from Shepard Color Company; and 22-5091 PK, 22-5096 PK, 22-4050 PK, 21-4047 PK, 23-10408 PK, 26-10550 PK, 24-775 PK, 24-10204 PK, 24-10430 PK, 24-10466 PK, V-9415 Yellow, V-9416 Yellow, 104 5 Golden Yellow, 1041 1 Golden Yellow, 10364 Brown, 10201 Eclipse Black, V-780 IR BRN Black, 10241 Forest Green, V-9248 Blue, V-9250 Bright Blue, F-5686 Turquoise, 10202 Eclipse Black, V-13810 Red, V-12600 IR Cobalt Green, V-12650 Hi IR Green, V-778 IR Brn Black, V-799 Brn Black, 10203 Eclipse Blue Black from Ferro. Ferro also sells a range of IR cooling pigments, in particular based on chromium and iron oxide, under the name Cool Colors®. Various IR cooling pigments are furthermore sold by Shepherd under the name Arctic®.

Other pigments, also called "IR transparent pigments", include Paliotol® Yellow K 0961 HD, Paliotol® Yellow K 1700, Paliotol® Yellow K 1841, Paliotol® Yellow K 2270, Diaryiide Yellow (opaque) 1270, Rightfit® Yellow K 1220, Rightfit® Yellow 8G 1222, Rightfit® Yellow R 1226, Rightfit® Yellow K 1994, Rightfit® Yellow 1292, Rightfit® Yellow 1293, Rightfit® Yellow 1296, Rightfit® Yellow 3R 1298, Synergy® Yellow HG 6202, Synergy® Yellow 6204, Synergy® Yellow 6205, Synergy® Yellow 6207, Synergy® Yellow 6210, Synergy® Yellow 6213, Synergy® Yellow 6222, Synergy® Yellow 6223, Synergy® Yellow 6225, Synergy® Yellow 6226, Synergy® Yellow 6233, Synergy® Yellow 6234, Synergy® Yellow 6235, Synergy® Yellow 6261, Synergy® Yellow 6268, Synergy® Yellow 6290, Synergy® Yellow 6298, Paliotol® Orange K 2920, Dianisidine Orange 2915, Synergy® Orange 6103, Synergy® Orange 6106, Synergy® Orange 6112, Synergy® Orange 6113, Synergy® Orange Y 6114, Synergy® Orange RL 6118, Synergy® Orange Y 6135, Synergy® Orange HL 6136, Synergy® Orange 6139, Synergy® Orange G 6164, Synergy® Orange 6170, Paliogen® Red K 3580, Paliogen® Red K 391 1 H, Citation® Red Light Barium 1058, Naphthol Red Light 3169, Naphthol Red 3170, Naphthol Red 3172, Naphthol Red 3175, MadderLake cone. 1092, Pigment Scarlet 1060, Rightfit® Red K 3790, Rightfit® Red K 4350, Rightfit® Red 117, Rightfit® Pink 1118, Synergy® Scarlet 6012, Synergy® Red 6016, Synergy® Red 6019, Synergy® Red 6054, Synergy® Red 6065, Synergy® Red 6069, Synergy® Red 6075, Transbarium 2B Red 1057, Synergy® Magenta 6062, Synergy® Red 6027, Supermaroon ST 1090, Paliogen® Red K 4180, Rightfit® Violet 1120, Paliogen® Red Violet K 501, Heliogen® Blue K 6850, Heliogen® Blue K 6902, Heliogen® Blue K 6903, Heliogen® Blue K 6907, Heliogen® Blue K 691 D, Heliogen® Blue K 6912 D, Heliogen® Blue K 7090, Heliogen® Blue K 7104 LW, Heliogen® Green 8605, Heliogen® Green K 8683, Heliogen® Green K 8730 2, Heliogen® Green K 8740 LW, Heliogen® Green K 9360, Lumogen® Black FK 4280, Lumogen® Black FK 4281 from BASF.

The IR cooling pigment is generally used in powder form. The shape and the size of the particles forming the powder is not particularly limited except by the application of 3D printing by sintering. The pigment particles most often have a spherical shape. However, their use in other shapes, such as in the form of rods or in lamellar form, is not excluded.

When the pigment is added to the dry-blend polymer composition, the pigment advantageously has a volume-median diameter Dv50 substantially equal to or less than that of the powder with which it will be mixed. More specifically, the volume-median diameter Dv50 of the pigment is preferably of between 0.01 and 50 μm, preferably between 0.05 and 30 μm, more preferably between 0.1 and 20 μm, in particular between 0.2 and 10 μm and very particularly between 0.5 and 5 μm.

The pigment composition (b) can comprise just one IR cooling pigment. However, most often, it will comprise several pigments, in particular in order to obtain a specific shade. In this context, it is possible to mix several IR cooling pigments or to add, to the IR cooling pigment(s), one or more conventional pigments not exhibiting this specific feature.

The conventional pigments can also be inorganic or organic pigments.

Mention may be made, among conventional inorganic pigments, for example, of ZnS, ZnO, $ZrO_2$, lithopone, $TiO_2$, iron oxides, such as $Fe_2O_3$, $Fe_3O_4$ or FeOOH, $Cr_2O_3$, $Cr_2O_3$—$H_2O$, nickel-titanium yellow, chrome-titanium yellow, manganese-titanium brown, zinc-ferrite brown, chrome-iron brown, spinel black, chrome yellow, molybdenum orange and red, cadmium-zinc sulfide yellow, cadmium sulfoselenide orange, cadmium sulfoselenide red, bismuth vanadate yellow, cerium sulfide orange and light orange, cerium sulfide red, cerium sulfide "Burgundy", ultramarine pigments, such as reddish blue, purple and pink, manganese violet, cobalt blue (Thénard's blue, cobalt blue and green derived from spinel) or also carbon black, in particular lampblack, furnace black and gas black.

Mention may be made, as conventional organic pigments, of azo (monoazo and diazo) pigments, such as diarylide pigments, phthalocyanines, quinacridones, such as isoindolines, and also perylene, anthraquinone, azomethine, pyrrolopyrrole and perinone pigments.

It is moreover possible to include, in the pigment composition, special effect pigments, such as metallic pigments, fluorescent pigments, pearlescent pigments or also variable color pigments, phosphorescent pigments, thermochromic pigments or also photochromic pigments.

In order to ensure the advantages of the invention, the component (b) preferably comprises at least 50%, preferably 70%, more preferably 85%, in particular 90% and very particularly 95% by weight of IR cooling pigments.

The content of pigment composition in the polymer powder according to the invention depends on several factors, in particular on the intensity of the desired shade and the coloring power of the pigments chosen. Preferably, the polymer powder comprises from 0.01% to 20%, preferably from 0.05% to 15%, more preferably from 0.1% to 10%, especially from 0.2% to 15%, in particular from 0.3% to 5% and very particularly from 0.5% to 2% by weight of component (b).

C. Fillers and Reinforcements

The polymer powder according to the invention can moreover optionally comprise, as the component (c), fillers or reinforcements, in particular in order to ensure that the printed article exhibits satisfactory mechanical properties, in particular in terms of modulus. These fillers can in particular be carbonate minerals, in particular calcium carbonate, magnesium carbonate, dolomite or calcite, barium sulfate, calcium sulfate, dolomite, alumina hydrate, wollastonite, montmorillonite, zeolite, perlite or nanofillers (fillers having a dimension of the order of a nanometer), such as nanoclays. Mention may in particular be made, by way of reinforcements, of carbon nanotubes, glass fibers and carbon fibers, and also glass beads optionally coated with silane. The component (c) can comprise one or more fillers and/or reinforcements. Advantageously, the fillers and reinforcements do not comprise pigments as defined above for the pigment composition.

More specifically, the powder of the invention can comprise from 0% to 60% or from 5% to 50% or from 10% to 40% or from 10% to 30% by weight of component (c). According to one embodiment, the polymer powder is devoid of fillers and reinforcements.

D. Additives

The polymer powder can finally additionally comprise, if appropriate, by way of the component (d), other additives usual in polymer powders used in 3D printing by sintering.

These can in particular be additives, in or not in powder form, which contribute to improving the behavior of the powder in 3D printing by sintering and those which make it possible to improve the properties of the printed articles, especially the mechanical properties, and in particular the elongation at break and the impact strength. These usual additives can in particular be chosen from flow agents, fireproofing agents, flame retardants, UV stabilizers, antiaging agents, antioxidants, anti-abrasion agents, light stabilizers, impact modifiers, antistatic agents and waxes. Advantageously, the additives do not comprise pigments as defined above for the pigment composition.

The component (d) can comprise one or more of these additives.

The polymer powder of the invention preferably comprises from 0% to 10%, preferably from 1% to 7.5% and in particular from 2% to 5% by weight of component (d).

According to one embodiment, the powder according to the invention comprises:

(a) from 30% to 99%, preferably from 40% to 95%, in particular from 50% to 90% and very particularly from 70% to 85% by weight of a polymer composition comprising at least one thermoplastic elastomer;

(b) from 0.01% to 20%, preferably from 0.1% to 10% and in particular from 1% to 5% by weight of a pigment composition comprising at least one pigment having low absorbance of IR rays;

(c) from 0% to 70%, preferably from 10% to 50% and in particular from 20% to 30% by weight of fillers or reinforcements; and (d) from 0% to 10%, preferably from 0.1% to 7.5% and in particular from 1% to 5% by weight of additives, the respective proportions of the components (a), (b), (c) and (d) adding up to 100%.

The powder according to the invention, in order to be suitable for 3D printing by sintering, will exhibit a suitable particle size distribution.

Typically, the polymer powder according to the invention has a Dv50 diameter of 40 to 150 μm and preferably of 50 to 100 μm. For example, the Dv50 diameter of the polymer powder can be from 40 to 45 μm; or from 45 to 50 μm; or from 50 to 55 μm; or from 55 to 60 μm; or from 60 to 65 μm; or from 65 to 70 μm; or from 70 to 75 μm; or from 75 to 80 μm; or from 80 to 85 μm; or from 85 to 90 μm; or from 90 to 95 μm; or from 95 to 100 μm; or from 100 to 105 μm; or from 105 to 110 μm; or from 110 to 115 μm; or from 115 to 120 μm; or from 120 to 125 μm; or from 125 to 130 μm; or from 130 to 135 μm; or from 135 to 140 μm; or from 140 to 145 μm; or from 145 to 150 μm.

E. Process for the Manufacture of the Powder

The polymer powder can be manufactured according to the usual processes.

The thermoplastic elastomers of use in the present invention are commercially available, in particular in the form of granules, flakes or powder. If necessary, the component (a) can be converted into powder, by means of known processes, in particular by grinding.

Preferably, the grinding is a cryogenic grinding. In this process, the material to be ground is cooled below the glass transition temperature of the thermoplastic elastomer, for example by means of liquid nitrogen, liquid carbon dioxide or liquid helium. The grinding can be carried out, for example, in a pin mill, a hammer mill or a whirl mill.

The grinding can be carried out before and/or after bringing the elastomer into contact with the various additives, namely the components (b) and, if appropriate, (c) and (d).

IR cooling pigments and other additives of the components (b), (c) and (d) are mostly available in powder form.

The pigment composition (component (b)) can be added to the polymer composition (component (a)) before grinding, in particular by addition of the pigment composition to the molten polymer, for example in an extruder (compounding). Alternatively or in addition, one or more additives can be added after grinding, for example by dry addition (dry blend). Furthermore, it is possible to mix the components by means of coprecipitation of the polymer composition from a solution in the presence of the additive component(s) (dissolution/precipitation).

Advantageously, the pigment component can be added to the polymer by means of a concentrated mixture of the pigment(s), called a masterbatch. It is also possible to employ the pigment(s) in the form of liquid preparations called stains or liquid dyes.

It is also possible to use several of these processes, according to the pigments and additives, for their introduction into the polymer composition.

The powder thus obtained can subsequently be sieved or subjected to a selection stage in order to obtain the desired particle size profile.

Before use, the polymer powder can subsequently, if appropriate, be subjected to various treatments, in particular heat or hydraulic treatments, in order for it to be better suited to 3D printing by sintering.

F. 3D Printing by Sintering

The polymer powder as described above is of use in particular for being employed in a process of 3D printing by sintering. Preferably, the composition of the invention is used in a selective laser sintering (SLS) process, a sintering process of the MJF (Multi Jet Fusion) type or a sintering process of the HSS (High Speed Sintering) type.

The SLS process is widely known. In this context, reference may in particular be made to the documents U.S. Pat. No. 6,136,948 and WO 96/06881.

In this type of process, a thin layer of powder is deposited on a horizontal plate maintained in a chamber heated to a temperature called the build temperature. Most often, the heating to the build temperature is carried out by means of IR radiation lamps, for example halogen lamps, which generally have an emission maximum at a wavelength of between 750 nm and 1250 nm. The build temperature denotes the temperature to which the bed of powder, of a constituent layer of a three-dimensional article under build-up, is heated during the process for the layer-by-layer sintering of the powder. Electromagnetic radiation, for example in laser form, subsequently contributes the energy necessary to sinter the powder particles at different points of the powder layer according to a geometry corresponding to an object, for example using a computer having in memory the shape of an object and recreating the shape in the form of slices. Subsequently, the horizontal plate is lowered by a height corresponding to the thickness of a powder layer, and a fresh powder layer is spread, heated and then sintered in the same way. The procedure is repeated until the object has been manufactured.

The powder layer deposited on a horizontal plate can have, before sintering, for example a thickness of 20 to 200 µm and preferably of 50 to 150 µm. After sintering, the thickness of the layer of agglomerated material is slightly lower, and can have, for example, a thickness of 10 to 150 am and preferably of 30 to 100 µm.

For the MJF and HSS processes, the entire layer of the build material is exposed to the radiation but only a portion covered with a melting agent is melted to become a layer of a 3D part. The melting agent is a compound capable of absorbing the radiation and of converting it into thermal energy, for example a black ink. It is applied selectively to the selected region of the build material. The melting agent is capable of penetrating into the layer of the build material and transmits the absorbed energy to the neighboring build material, thus causing it to melt or to be sintered. By the melting, the bonding and the subsequent hardening of each layer of the build material, the object is formed.

In the specific case of MJF, a detailing agent is additionally added to the edges of the zone to be melted in order to make it possible for the parts to have a better definition.

Advantageously, the use of the polymer powder of the invention in these processes does not require any specific modification. As mentioned above, it makes it possible on the other hand to work at a build temperature closer to the melting temperature of the polymer.

The polymer powder according to the invention can be recycled and reused in several successive build-ups. It can, for example, be used as it is or as a mixture with other powders, which are or are not recycled.

The use of an IR cooling pigment, in particular in the powder composition according to the invention, thus makes it possible to manufacture three-dimensional articles of good quality, having good mechanical properties and precise and well-defined dimensions and contours.

The invention will be explained in greater detail in the examples which follow.

EXAMPLES

Materials Used:

Polymer 1: Polyetheresteramide with a viscosity of 1.55 (Pebax 40R53) in powder form (Dv50=60 µm) to which has been added 1% by weight, with respect to the weight of the polymer, of a flow agent (hydrophobic fumed silica, Cab-O-Sil® TS610 (Dv50=50 µm), sold by Cabot Corporation).

Polymer 2: Polyetheresteramide with a viscosity of 1.55 (Pebax 40R53) in powder form (Dv50=60 µm) to which has been added 0.5% by weight, with respect to the weight of the polymer, of a flow agent (hydrophobic fumed silica, Cab-O-Sil® TS610, Dv50=50 µm, sold by Cabot Corporation).

Pigment N1: black pigment based on carbon black (Monarch 800 sold by Cabot Corporation, Dv50=800 nm). This pigment exhibits an absorbance of IR radiation, as defined above, of >50% at 1000 nm. It is thus not an "IR cooling pigment" within the meaning of this patent application.

Pigment N2: black pigment based on chromium(III) and iron oxide (Sicopal Black K-0095 sold by BASF, Dv50=1.5 am). This pigment exhibits an absorbance of IR radiation, as defined above, of <50% at 1000 nm. It is thus an "IR cooling pigment" within the meaning of this patent application.

Pigment BL: blue pigment based on mixed cobalt and copper oxide (Ferro PS 22-5096 sold by Ferro Pigments, Dv50=0.9 am). This pigment exhibits an absorbance of IR radiation, as defined above, of <50% at 1000 nm. It is thus an "IR cooling pigment" within the meaning of this patent application.

Pigment BC: white pigment based on titanium dioxide (rutile, TR92 sold by Huntsman, Dv50=240 nm). This pigment exhibits an absorbance of IR radiation, as defined above, of <50% at 1000 nm. It is thus an "IR cooling pigment" within the meaning of this patent application.

Examples 1 to 5 and Reference Examples A and B

Various polymer powders for 3D printing by sintering were prepared according to the protocol described below.

For each powder, the polymer is ground in a cryogenic pin mill. A polymer powder is obtained exhibiting a particle size distribution, as measured according to the standard ISO 13320, characterized by a Dv10 of 25 µm, a Dv50 of 60 am and a Dv90 of 125 µm. After addition of the flow agent, the polymer powders are used as is for examples Ref. A and Ref. B.

For examples 1-5, a pigment is added to the polymer powder by dry blending as follows. The polymer powder prepared is introduced with a pigment into a Henschel IAM 6 L mixer in the proportions indicated in table 1 below and the mixture is stirred at 9000 revolutions/min for 100 s at ambient temperature.

TABLE 1

| Example | Polymer powder 1 [% by weight] | Polymer powder 2 [% by weight] | Pigment N1 [% by weight] | Pigment N2 [% by weight] | Pigment BL [% by weight] | Pigment BC [% by weight] |
|---|---|---|---|---|---|---|
| Ref. A | 100 | — | — | — | — | — |
| Ref. B | — | 100 | — | — | — | — |
| 1 | 99.5 | — | 0.5 | — | — | — |
| 2 | 98.0 | — | — | — | 2.0 | — |
| 3 | — | 99.5 | — | — | — | 0.5 |
| 4 | — | 99.5 | 0.5 | — | — | — |
| 5 | — | 99.5 | — | 0.5 | — | — |

Composition of the polymer powders

1. Mechanical Properties and Definition of the Printed Articles

The pigmented polymer powder thus obtained is subsequently used to manufacture, by 3D printing by sintering, more specifically by SLS, a test specimen IBA XY (test specimen IBA according to the standard ISO 527-1BA, called "XY" because printed in the horizontal plane of the printer) by laser sintering on a Sharebot Snowwhite machine under the conditions of temperature of the powder and of the chamber indicated in table 2 below. The power of the laser was adjusted so as to make possible good printing of the pigment-free powder, to end up with an object having good mechanical properties. The laser conditions used are the same for all the printings with the same polymer.

During the build-up, the temperature of the powder at the surface of the build tank is set, and measured at the surface by means of an infrared heat sensor. The temperature of the air in the chamber is measured by means of a temperature probe placed inside the machine, at less than 10 cm from the build tank.

The test specimens thus obtained are subsequently characterized in terms of their mechanical properties. More specifically, the elongation at break of the test specimens is measured on an Instrom 5966 machine according to the standard ISO 527-2. The elongation at break indicated corresponds to the mean of the cross-direction elongation at break measured for five IBA XY test specimens printed. The test specimens are furthermore visually evaluated in terms of the definition of the printing. The results are collated in table 2 below.

The examples demonstrate that, under comparable conditions, the difference between the temperature of the chamber and the temperature at the surface of the powder is increased for the polymer powders of examples 1 and 4 compared with the reference powder. In point of fact, these powders contain a pigment which absorbs in the region of the near infrared (carbon black).

In contrast, the powders colored by means of IR cooling pigments within the meaning of the patent application exhibit a reduced temperature difference (see examples 2 and 3).

TABLE 2

| Example | T powder [° C.] | T chamber [° C.] | Difference [° C.] | Elongation at break [%] | Definition |
|---|---|---|---|---|---|
| Ref. A | 133 | 108 | 25 | 350 | Good |
| Ref. B | 133 | 108 | 25 | 400 | Moderate |
| 1 | 133 | 106 | 27 | 280 | Very bad |
| 1 | 127 | 102 | 25 | 100 | Good |
| 2 | 133 | 110 | 23 | 350 | N.D. |
| 2 | 135 | 111 | 24 | 400 | Good |
| 3 | 133 | 110 | 23 | 350 | Good |
| 4 | 133 | 106 | 27 | 280 | Very bad |
| 4 | 127 | 102 | 25 | 100 | Good |
| 5 | 133 | 108 | 25 | 350 | Good |

Powder printing conditions and properties
N.D.: Not determined

A higher build temperature for one and the same temperature of the surface of the powder makes it possible to improve the mechanical properties, in particular the elongation at break, due to a better coalescence of the powder grains (see example 2, 400% for a build temperature of 111° C.).

Furthermore, it is noted that the addition of a pigment to the polymer powder can very markedly damage the elongation at break of the printed article. This is because the test specimen manufactured with an uncolored polymer powder exhibits an elongation at break of 350% (example Ref. 1), whereas the test specimen manufactured with the same polymer powder, with the addition of 0.5% by weight of carbon black, under comparable printing conditions exhibits an elongation at break of only 280%.

Example 2 demonstrates that the pigment BL does not affect the elongation at break of the test specimens obtained under comparable printing conditions. Furthermore, a very good definition of the test specimens is observed for these powders.

Examples 4 and 5 furthermore demonstrate that a polymer powder colored with carbon black, a pigment having strong absorption in the infrared (pigment N1, example 4), gives test specimens with inferior properties, both in terms of the elongation at break and of the definition, compared with this polymer powder colored with another black pigment, based on metal oxides and absorbing only slightly in the infrared (pigment N2, example 5). They also demonstrate that the effect observed is not linked to the color of the pigment but clearly to its absorbance in the IR region.

In contrast, an acceptable definition is only possible with the powder colored with carbon black if the temperature of the powder and of the chamber are lowered. Such a lowering in temperature, however, results in a deterioration in the sintering quality, revealed by a lower elongation at break (example 4).

The results thus demonstrate that the addition, to polymer powders intended for 3D printing by sintering, of pigments exhibiting a low absorbance in the infrared range makes it possible to improve the mechanical properties and the definition of printed articles.

LIST OF THE DOCUMENTS CITED

U.S. Pat. No. 6,136,948
WO 96/06881
EP 613 919 A1
JP 2004346274
JP 2004352794
EP 1 482 011 A1
FR2846332A1
EP 1 482 011 A1
EP 402 883 A1
EP 405 227 A1

The invention claimed is:

1. A polymer powder suitable for three-dimensional (3D) printing by sintering, comprising:

(a) a polymer composition comprising at least one thermoplastic elastomer;

(b) a pigment composition comprising at least one pigment exhibiting an absorbance of the light with wavelengths of the spectrum from 750 to 1250 nm, as measured according to the standard ASTM E1790, of less than 35%;

(c) optionally, one or more fillers or reinforcements; and (d) optionally, one or more additional additives, wherein the pigment has a volume-median diameter Dv50 less than that of the polymer powder, wherein the polymer powder comprises from 0.3% by weight to 2% by weight of the pigment composition.

2. The powder as claimed in claim 1, wherein the polymer powder exhibits a Dv50 diameter, as measured according to the standard ISO 9276-Parts 1 to 6, of 40 to 150 μm.

3. The powder as claimed in claim 1, wherein the thermoplastic elastomer is selected from the group consisting of a copolymer having polystyrene and polybutadiene blocks (SBS), a copolymer having polystyrene and polyisoprene blocks (SIS), a copolymer having polystyrene and poly (ethylene/butylene) blocks (SEBS), a copolymer having isocyanate and ether or ester blocks (TPU), a copolymer having polyester and polyester or polyether blocks (COPE), a copolymer having polyamide and polyether blocks (PEBA), and mixtures and alloys thereof.

4. The powder as claimed in claim 3, wherein the thermoplastic elastomer is selected from PEBA.

5. The powder as claimed in claim 1, wherein the thermoplastic elastomer is selected from the group consisting of thermoplastic polyolefin (TPO), a copolymer of butadiene and acrylonitrile, vulcanized or not, dispersed in a polypropylene (PP/NBR), a chlorinated polyethylene dispersed in a polyolefin (PO/CPE-VD), an ethylene vinylidene acetate dispersed in vinylidene chloride (EVA/VC), a copolymer of butadiene and acrylonitrile, vulcanized or not, dispersed in a polyvinyl chloride (PVC/NBR), and mixtures thereof.

6. The powder as claimed in claim 1, wherein the pigment is at least one compound selected form the group consisting of metal oxides, transition metal oxides, and mixtures thereof, mixed oxides, and doped oxides.

7. The powder as claimed in claim 6, wherein the pigment is at least one oxide selected from the group consisting of tin, magnesium, copper, zinc, iron, manganese, cobalt, nickel, aluminum, antimony, chromium, titanium, or silicon oxides, and mixtures thereof, mixed oxides, and doped oxides.

8. A three-dimensional (3D) printing process comprising sintering the polymer powder as claimed in claim 1.

9. An article obtained by three-dimensional (3D) printing by sintering of the polymer powder as defined in claim 1.

* * * * *